United States Patent
Zhang et al.

(10) Patent No.: US 12,250,049 B2
(45) Date of Patent: Mar. 11, 2025

(54) METHOD AND APPARATUS FOR INTERFERENCE AVOIDANCE

(71) Applicant: Telefonaktiebolaget LM Ericsson (PUBL), Stockholm (SE)

(72) Inventors: Qi Zhang, Beijing (CN); Chunhui Liu, Beijing (CN); Wei Zhou, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 483 days.

(21) Appl. No.: 17/637,956

(22) PCT Filed: Sep. 11, 2019

(86) PCT No.: PCT/CN2019/105419
§ 371 (c)(1),
(2) Date: Feb. 24, 2022

(87) PCT Pub. No.: WO2021/046763
PCT Pub. Date: Mar. 18, 2021

(65) Prior Publication Data
US 2022/0286185 A1  Sep. 8, 2022

(51) Int. Cl.
*H04W 24/10* (2009.01)
*H04B 7/06* (2006.01)
*H04B 17/336* (2015.01)

(52) U.S. Cl.
CPC ......... *H04B 7/0695* (2013.01); *H04B 17/336* (2015.01); *H04W 24/10* (2013.01)

(58) Field of Classification Search
CPC .. H04W 36/0072; H04W 36/08; H04W 36/30
USPC .................................. 370/329, 400, 405
See application file for complete search history.

(56) References Cited

U.S. PATENT DOCUMENTS

| | | | |
|---|---|---|---|
| 2010/0056171 | A1 | 3/2010 | Ramprashad et al. |
| 2013/0279356 | A1 | 10/2013 | Park et al. |
| 2015/0365142 | A1 | 12/2015 | Chai et al. |
| 2017/0230910 | A1 | 8/2017 | Kimura |
| 2017/0331670 | A1* | 11/2017 | Parkvall ............ H04W 52/0251 |
| 2018/0020363 | A1 | 1/2018 | Faxer et al. |

OTHER PUBLICATIONS

Extended European Search Report issued for Application No. /Patent No. 19945197.2-1206 / 4029303 PCT/CN2019105419—Apr. 5, 2023.
3GPP TS 38.212 v15.5.0; Technical Specification; 3rd Generation Partnership Project; Technical Specification Group Radio Access Network; NR; Multiplexing and channel coding (Release 15)—Mar. 2019.

(Continued)

*Primary Examiner* — Dang T Ton
(74) *Attorney, Agent, or Firm* — Baker Botts L.L.P.

(57) ABSTRACT

Various embodiments of the present disclosure provide a method for interference avoidance. The method which may be performed by a network node comprises selecting a serving beam for a terminal device from candidate beams reported to the network node by the terminal device, based at least in part on inter-cell interference information of the candidate beams. The method may further comprise informing the terminal device of the selected serving beam.

18 Claims, 12 Drawing Sheets

(56) References Cited

OTHER PUBLICATIONS

3GPP TS 38.213 v15.5.0; Technical Specification; 3rd Generation Partnership Project; Technical Specification Group Radio Access Network; NR; Physical layer procedures for control (Release 15)—Mar. 2019.
3GPP TS 38.214 v15.5.0; Technical Specification; 3rd Generation Partnership Project; Technical Specification Group Radio Access Network; NR; Physical layer procedures for data (Release 15)—Mar. 2019.
PCT Notification of Transmittal of the International Search Report and the Written Opinion of the International Searching Authority, or the Declaration issued for International application No. PCT/CN2019/105419—May 27, 2020.

* cited by examiner

METHOD AND APPARATUS FOR INTERFERENCE AVOIDANCE

PRIORITY

This nonprovisional application is a U.S. National Stage Filing under 35 U.S.C. § 371 of International Patent Application Serial No. PCT/CN2019/105419 filed Sep. 11, 2019 and entitled "METHOD AND APPARATUS FOR INTERFERENCE AVOIDANCE" which is hereby incorporated by reference in its entirety.

FIELD OF THE INVENTION

The present disclosure generally relates to communication networks, and more specifically, to method and apparatus for interference avoidance.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to meet dramatically increasing network requirements, one interesting option for communication technique development is to employ multiple antenna technology. Multiple antenna systems allow transmitting signals focused towards certain spatial regions. This creates beams (also referred to as beamforming) whose coverage can go beyond transmissions using non-beamformed signals. Beam management can help achieve potentially performance gain by fine beam alignment for directional links.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network such as 5G/NR network, radio devices such as a user equipment (UE) and a next generation NodeB (gNB) may be equipped with multiple antenna elements. Generally, the gNB may perform beam management by configuring the UE to report measurements on a limited number of favorable beams and selecting one or more transmission beams for downlink (DL) from the reported favorable beams. For the network supporting multi-antenna communications, a beam configured for a cell may be interfered by one or more beams configured for another cell. Some approaches such as power control, joint transmission/reception and scheduling coordination may be used to cancel or avoid inter-cell interference. However, these approaches may increase signaling overhead and capability requirement for a radio device. Therefore, it may be desirable to implement inter-cell interference avoidance in a more efficient way.

Various embodiments of the present disclosure propose a solution for interference avoidance, which can enable a network node to select for a terminal device a serving beam with relatively less or no inter-cell interference, for example, in a grid of beam (GoB) system, so that the network throughput can be enhanced with more flexible space division multiplexing (SDM).

According to a first aspect of the present disclosure, there is provided a method performed by a network node (e.g., a base station). The method comprises selecting a serving beam for a terminal device from candidate beams reported to the network node by the terminal device, based at least in part on inter-cell interference information of the candidate beams. The method may further comprise informing the terminal device of the selected serving beam.

According to a second aspect of the present disclosure, there is provided an apparatus which may be implemented as a network node. The apparatus may comprise one or more processors and one or more memories comprising computer program codes. The one or more memories and the computer program codes may be configured to, with the one or more processors, cause the apparatus at least to select a serving beam for a terminal device from candidate beams reported to the network node by the terminal device, based at least in part on inter-cell interference information of the candidate beams. According to some exemplary embodiments, the one or more memories and the computer program codes may be configured to, with the one or more processors, cause the apparatus at least further to inform the terminal device of the selected serving beam.

In accordance with some exemplary embodiments, the one or more memories and the computer program codes may be configured to, with the one or more processors, cause the apparatus according to the second aspect of the present disclosure at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a network node. The apparatus may comprise a selecting unit and an informing unit. In accordance with some exemplary embodiments, the selecting unit may be operable to carry out at least the selecting step of the method according to the first aspect of the present disclosure. The informing unit may be operable to carry out at least the informing step of the method according to the first aspect of the present disclosure.

According to a fifth aspect of the present disclosure, there is provided a method performed by a terminal device (e.g., a UE). The method comprises receiving, from a network node, information about a serving beam selected from candidate beams reported to the network node by the terminal device. The selection of the serving beam may be based at least in part on inter-cell interference information of the candidate beams.

In accordance with some exemplary embodiments, the method according to the fifth aspect of the present disclosure may further comprise: receiving measurement configuration information for the terminal device from the network node, in response to evaluation of the inter-cell beam interference for the network node. The measurement configuration information may instruct the terminal device to report neighboring cell measurement information to the network node in response to a trigger event.

In accordance with some exemplary embodiments, the method according to the fifth aspect of the present disclosure may further comprise: performing neighboring cell measurement according to the measurement configuration information for the terminal device.

In accordance with some exemplary embodiments, the method according to the fifth aspect of the present disclosure may further comprise: transmitting the neighboring cell measurement information of the terminal device to the network node, in response to the trigger event. The neighboring cell measurement information may indicate potential inter-cell interferers of the candidate beams reported to the network node by serving cell measurement information of the terminal device.

According to a sixth aspect of the present disclosure, there is provided an apparatus which may be implemented as a terminal device. The apparatus comprises one or more processors and one or more memories comprising computer program codes. The one or more memories and the computer program codes may be configured to, with the one or more processors, cause the apparatus at least to receive, from a network node, information about a serving beam selected from candidate beams reported to the network node by the terminal device. The selection of the serving beam may be based at least in part on inter-cell interference information of the candidate beams.

In accordance with some exemplary embodiments, the one or more memories and the computer program codes may be configured to, with the one or more processors, cause the apparatus according to the sixth aspect of the present disclosure at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a terminal device. The apparatus may comprise a receiving unit. In accordance with some exemplary embodiments, the receiving unit may be operable to carry out at least the step of receiving the information about the selected serving beam for the terminal device in the method according to the fifth aspect of the present disclosure. Optionally, the receiving unit may be operable to carry out the step of receiving the measurement configuration information in the method according to the fifth aspect of the present disclosure.

In accordance with some exemplary embodiments, the inter-cell interference information of the candidate beams may indicate at least one of: the number of inter-cell interferers per candidate beam, and interference level of the inter-cell interferers per candidate beam.

In accordance with some exemplary embodiments, the candidate beams may be reported to the network node by serving cell measurement information of the terminal device. The serving cell measurement information may comprise information indicating that the terminal device is potentially subject to inter-cell beam interference.

In accordance with some exemplary embodiments, the serving cell measurement information of the terminal device may indicate at least one of: serving cell signal quality of the terminal device being lower than a first quality threshold, and at least one of the candidate beams meeting a first criterion.

In accordance with some exemplary embodiments, the inter-cell interference information of the candidate beams may be based on at least one of: predetermined beam configuration information, and an evaluation of inter-cell beam interference for the network node.

In accordance with some exemplary embodiments, the evaluation of the inter-cell beam interference for the network node may comprise: performing measurement configuration for one or more reference devices which are potentially subject to inter-cell beam interference. The measurement configuration may instruct the one or more reference devices to report neighboring cell measurement information to the network node in response to a trigger event.

In accordance with some exemplary embodiments, the evaluation of the inter-cell beam interference for the network node may further comprise: receiving the neighboring cell measurement information reported by the one or more reference devices in response to the trigger event. The neighboring cell measurement information may indicate potential inter-cell interferers of beams reported to the network node by serving cell measurement information of the one or more reference devices.

In accordance with some exemplary embodiments, the evaluation of the inter-cell beam interference for the network node may further comprise: evaluating the inter-cell beam interference, based at least in part on the neighboring cell measurement information reported by the one or more reference devices.

In accordance with some exemplary embodiments, the serving cell measurement information of the one or more reference devices may indicate at least one of: serving cell signal quality of at least one of the one or more reference devices being lower than a second quality threshold, and at least one of the beams reported by the one or more reference devices meeting a second criterion.

In accordance with some exemplary embodiments, the trigger event for a reference device may comprise that neighboring cell signal quality of the reference device is higher than a third quality threshold.

In accordance with some exemplary embodiments, the one or more reference devices may comprise the terminal device. In this case, the serving cell measurement information of the terminal device may indicate at least one of: serving cell signal quality of the terminal device being lower than the second quality threshold, and at least one of the candidate beams reported by the terminal device meeting the second criterion. The trigger event for the terminal device may comprise that neighboring cell signal quality of the terminal device is higher than the third quality threshold.

In accordance with some exemplary embodiments, the evaluation of the inter-cell beam interference for the network node may be updated according to a specific rule.

In accordance with some exemplary embodiments, the candidate beams may be pre-defined at the network node (e.g., in a GoB system).

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
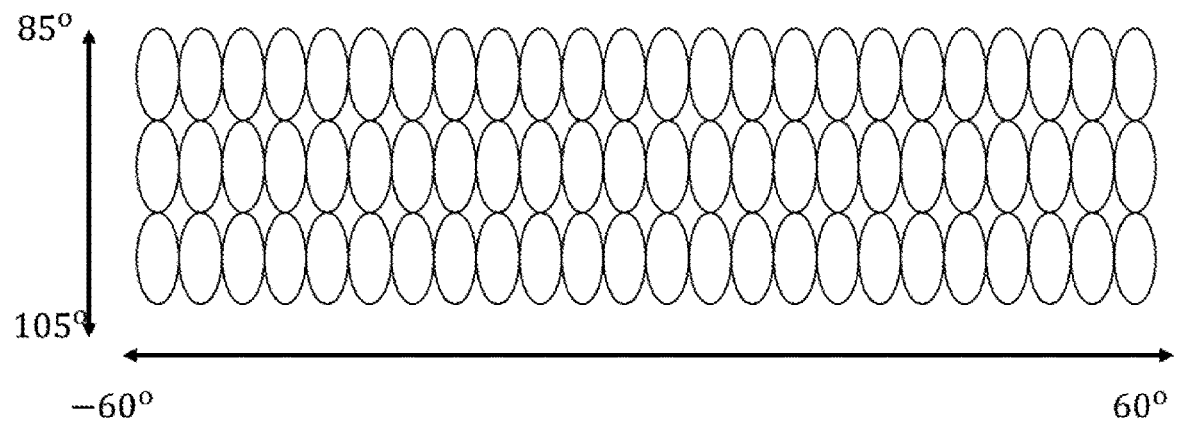
FIG. 1 is a diagram illustrating an exemplary grid of beam (GoB) system according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

From analog communication technologies through LTE, each generation of mobile technology is motivated by the need to address the challenges which are not overcome by its predecessor. The mobile technology such as 5G is positioned to address the demands and business beyond LTE. It is expected to enable a fully mobile and connected society, related to the tremendous growth in connectivity and density/volume of traffics that may be required in the near future.

Next-generation mobile communications are recently gathering increased momentum with all the world-wide technical activities on the various candidate technologies from industry and academia. A large variety of requirements for the next generation such as 5G network implies that frequency bands at many different carrier frequencies may be needed. For example, low bands may be needed to achieve enough coverage and higher bands (e.g. in the mm-wave region, i.e. near and above 30 GHz) may be needed to reach the required capacity. At high frequencies, the propagation properties are more challenging and beamforming both at a gNB and at a UE may be required to reach enough link budget.

FIG. 1 is a diagram illustrating an exemplary grid of beam (GoB) system according to an embodiment of the present disclosure. In the GoB system, there may be some predefined beams employed by a gNB for data transmission. As shown in FIG. 1, the pre-defined beams configured in the exemplary GoB system may cover horizontal 120 degree (e.g., from −60° to 60°) with 24 narrow beams and each narrow beam may cover nearly 5 degree in the horizontal dimension and nearly 6 degree in vertical dimension. It will be appreciated that the beam arrangement shown in FIG. 1 is just as an example, and other beam arrangement (e.g., more or less beams and/or alternative coverage configuration, etc.) may be employed in the GoB system according to some embodiments of the present disclosure.

Next-generation communication networks such as 5G/NR networks may provide a set of mechanisms by which UEs and gNBs can establish highly directional transmission links, typically using high-dimensional phased arrays, to benefit from the resulting beamforming gain and sustain the acceptable communication quality. Directional links, however, require fine alignment of transmission (TX) and reception (RX) beams, which may be achieved through a set of operations related to beam management. The beam management is fundamental to perform a variety of control tasks including initial access of idle users, which allows a UE to establish a physical link connection with a gNB, and beam tracking for connected users, which enables beam adaptation schemes, handover, path selection and/or radio link failure recovery procedures.

In accordance with an exemplary embodiment, beam management may be associated with a GoB system for UE intra-cell mobility. For example, the beam management may contain the following basic procedures:

Beam sweeping: a gNB configures a UE to perform measurement on a set of beamformed synchronization signal and physical broadcast channel block (SSB)/channel state information-reference signal (CSI-RS) transmitted by the gNB;

Beam measurement: the UE measures reference signal received power (RSRP);

Beam reporting: the UE indicates a preferred gNB TX beam by reporting a CSI-RS resource indicator (CRI/SSB index) and its associated RSRP (in a general case) to the gNB (e.g., the UE can report N best CRIs and RSRP, where N may be up to 4), and optionally the UE may be configured to report channel quality information/precoding matrix indicator/rank indication (CQI/PMI/RI) as well; and Beam determination: the gNB determines the preferred beam according to the UE's report for data transmission in the GoB system.

In accordance with some exemplary embodiments, the UE mobility related measurement/report may comprise measurement/report of a neighboring cell by the UE, which can be configured to facilitate UE inter-cell mobility (e.g., in the case of handover). According to measurement resource configuration, the measured resource may be SSB or CSI-RS of a neighboring cell. For example, the information element (IE) MeasObjectNR may specify information applicable for SSB(s) intra/inter-frequency measurements or CSI-RS intra/inter-frequency measurements. According to measurement report configuration, a measurement report can be triggered by a specific event or periodically. In order to save radio resource for data transmission, the measurement report may be configured to be triggered by one or more following events:

Event A1: Serving becomes better than an absolute threshold;

Event A2: Serving becomes worse than an absolute threshold;

Event A3: Neighbor becomes amount of offset better than a primary cell/primary secondary cell (PCell/PSCell);

Event A4: Neighbor becomes better than an absolute threshold;

Event A5: PCell/PSCell becomes worse than a first absolute threshold AND neighbor/secondary cell (SCell) becomes better than a second absolute threshold; and Event A6: Neighbor becomes amount of offset better than a SCell.

According to an exemplary embodiment, the maximum number (e.g., up to 32) of reference signals (RSs) that can be reported may be configured by an IE such as maxNrofRSIndexesToReport. The report quantity may be reference signal received power (RSRP)/reference signal received quality (RSRQ)/signal to interference plus noise ratio (SINR). The measurement on the configured resource may be associated with a measurement report. Table 1 shows UE mobility related measurement configurations.

TABLE 1

| Purpose | Measurement | Configured Resource | Configured report |
|---|---|---|---|
| Intra-cell mobility | L1 measurement | SSB/CSI-RS | Resource index + RSRP/CQI |
| Inter-cell mobility | L3/RRM measurement | SSB/CSI-RS | Resource index + RSRP/RSRQ/SINR |

As shown in Table 1, the measurements may comprise L1 (physical layer) measurement configured for UE intra-cell mobility and L3/RRM (network layer/radio resource management) measurement configured for UE inter-cell mobility. In an exemplary embodiment, the intra-cell mobility related measurement on the configured resource such as SSB/CSI-RS can be reported to a gNB by a UE using a resource index and RSRP/CQI. Similarly, the inter-cell mobility related measurement on the configured resource such as SSB/CSI-RS can be reported to the gNB by the UE using a resource index and RSRP/RSRQ/SINR.

In some cases, communications of the UE with its serving cell may be interfered by signals from a neighboring cell. There may be several approaches for inter-cell interference avoidance or cancellation, for example, including soft frequency multiplexing, power control, coordinated multi-point transmission/reception (CoMP), cell scheduling coordination and interference randomization.

Figure 2:
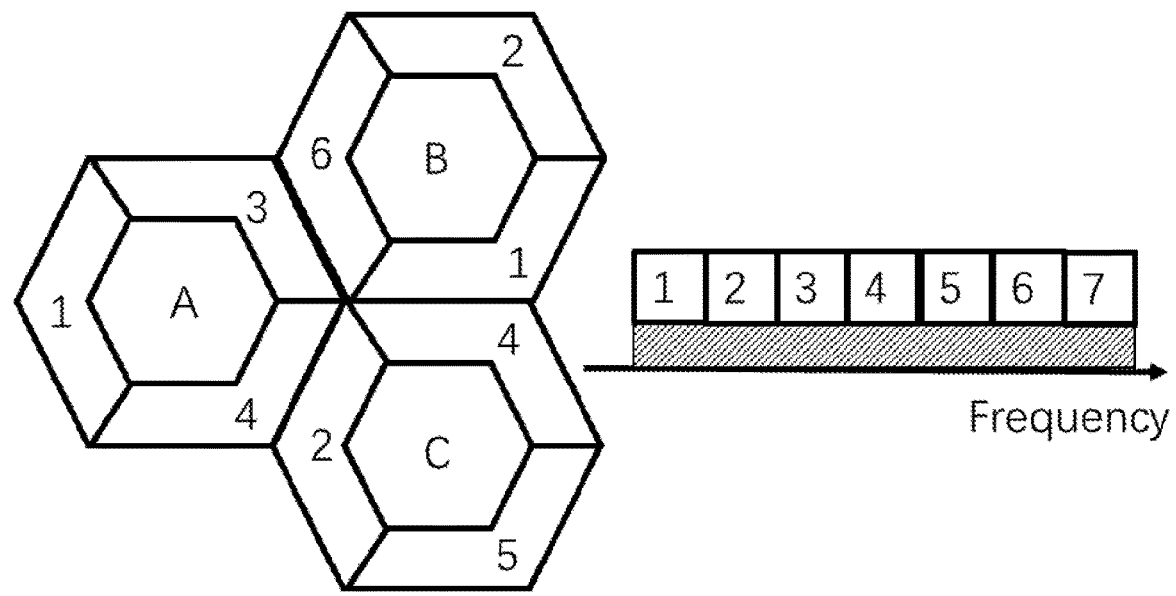
FIG. 2 is a diagram illustrating an example of soft frequency multiplexing according to an embodiment of the present disclosure.

FIG. 2 is a diagram illustrating an example of soft frequency multiplexing according to an embodiment of the present disclosure. For simplicity, FIG. 2 only schematically depicts three cells (i.e., cell A, cell B and cell C) and seven available frequency bands (i.e., frequency bands 1, 2, 3, 4, 5, 6 and 7). It will be appreciated that the cell deployment and frequency allocation shown in FIG. 2 are just as examples, and alternative cell deployment and frequency allocation (e.g., more or less cells and/or available frequency bands) may be applied according to some embodiments of the present disclosure.

In the case of soft frequency multiplexing, the cell center can use the full frequency spectrum (including frequency bands 1, 2, 3, 4, 5, 6 and 7), and the cell edge can use parts of frequency spectrum (e.g., frequency bands 1, 3 and 4 for the edge of cell A, frequency bands 1, 2 and 6 for the edge of cell B, and frequency bands 2, 4 and 5 for the edge of cell C). Soft frequency multiplexing may not need information exchange between cells, but may need optimize the whole network in advance. For example, the frequency resource allocation may need to be predetermined so as to implement soft frequency multiplexing. This may decrease configuration flexibility (especially when the cell load is imbalanced) and the frequency usage may be low, which is bad for cell throughput.

Compared with soft frequency multiplexing, the cell scheduling coordination can coordinate scheduling of cells in frequency domain dynamically. However, it requires scheduling information exchange among cells. Another possible approach usable for inter-cell interference avoidance is power control, for example, including uplink (UL) power control for a serving cell and downlink (DL) power assignment for the serving cell. However, this approach may cause a drop of serving cell performance. Alternatively, coordinated multi-point transmission/reception may be used to avoid inter-cell interference. Joint transmission/reception of multiple points can improve communication performance of a cell edge user and the cell throughput, but it requires the multiple points to share data/channel/schedule information with each other. Interference randomization may also be used to transform cell interference to white noise, but it cannot cancel the interference. Other approaches like joint detection and interference cancellation may require a high processing capability of a UE.

It can be seen that there are many drawbacks in traditional inter-cell interference avoidance/cancellation approaches, such as information exchange among cells, implementation complexity or requirement of UE capacity/capability, etc. Moreover, according to the approach of soft frequency multiplexing, the cell edge is configured by frequency division multiplexing (FDM) between cells, while it may not be necessary for the case of a GoB system as described with respect to FIG. 1. With pre-defined beams in the GoB system, the cell edge can be configured by SDM between cells in the same frequency band.

Figure 3A:
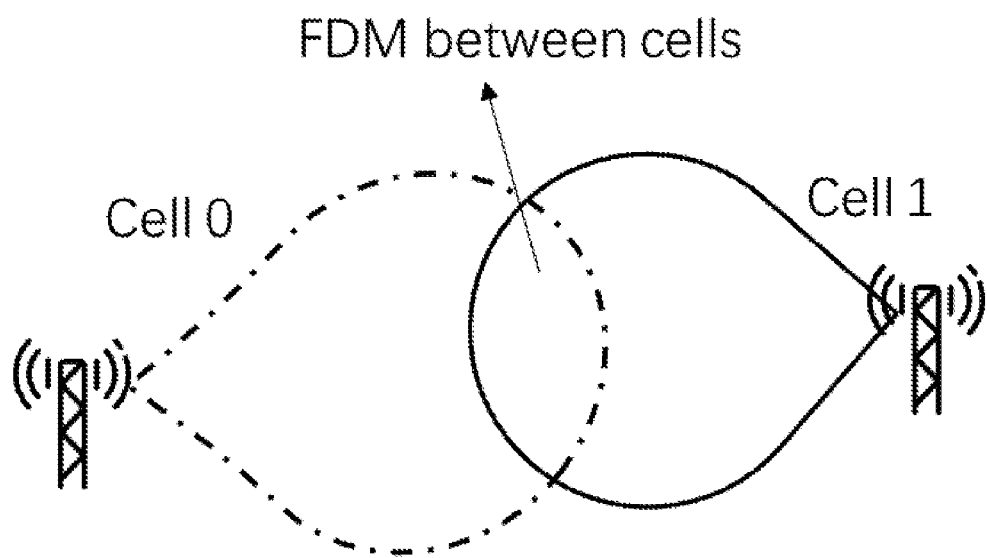
FIG. 3A-3B are diagrams illustrating exemplary multiplexing applied at cell edge according to some embodiments of the present disclosure.
Figure 3B:
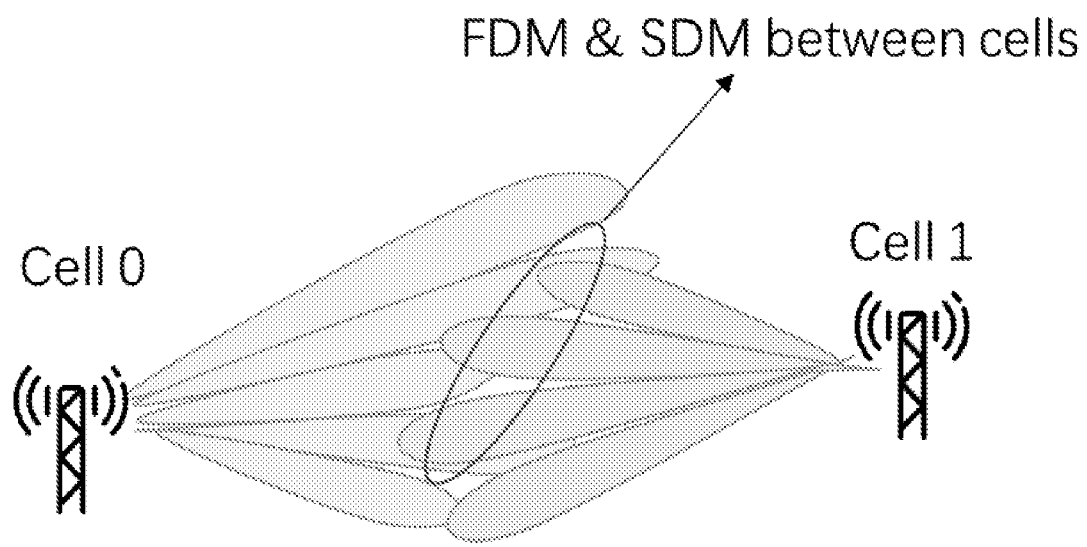

FIG. 3A-3B are diagrams illustrating exemplary multiplexing applied at cell edge according to some embodiments of the present disclosure. In a network scenario as shown in FIG. 3A, the cell edge is configured by FDM between cell 0 and cell 1. In a network scenario as shown in FIG. 3B, a GoB system is deployed for data transmissions of cells such as cell 0 and cell 1. In this case, the cell edge may be configured by FDM&SDM between cell 0 and cell 1, where the data transmissions can be differentiated by frequency resource and beam resource. Although application of SDM can increase multiplexing gain and network throughput, UEs at cell edge may still experience inter-cell interference.

Figure 4A:
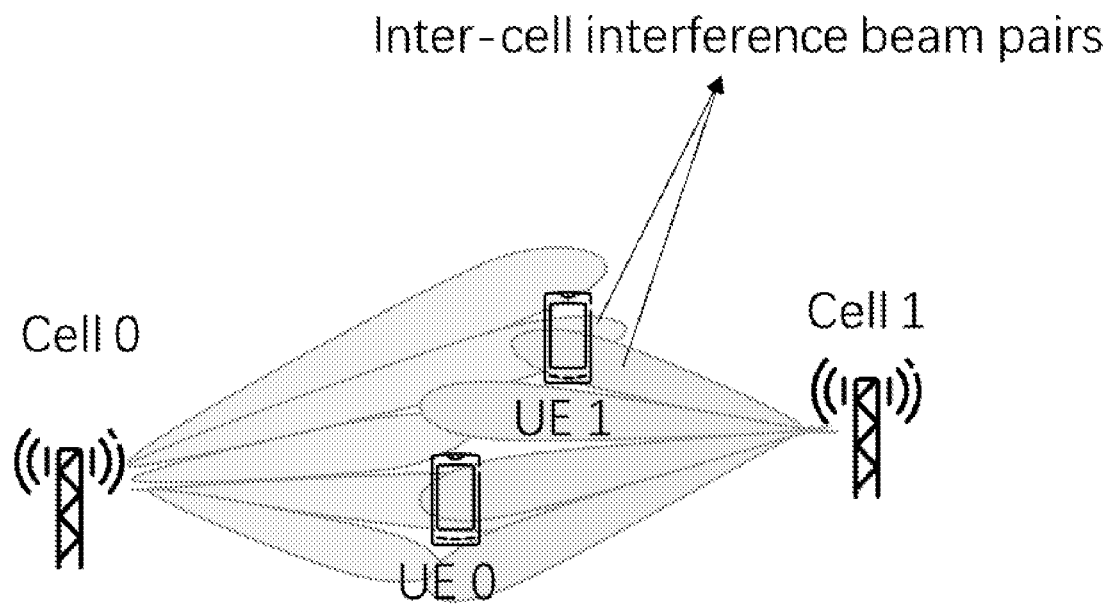
FIG. 4A-4B are diagrams illustrating exemplary inter-cell interference beam pairs according to some embodiments of the present disclosure.
Figure 4B:
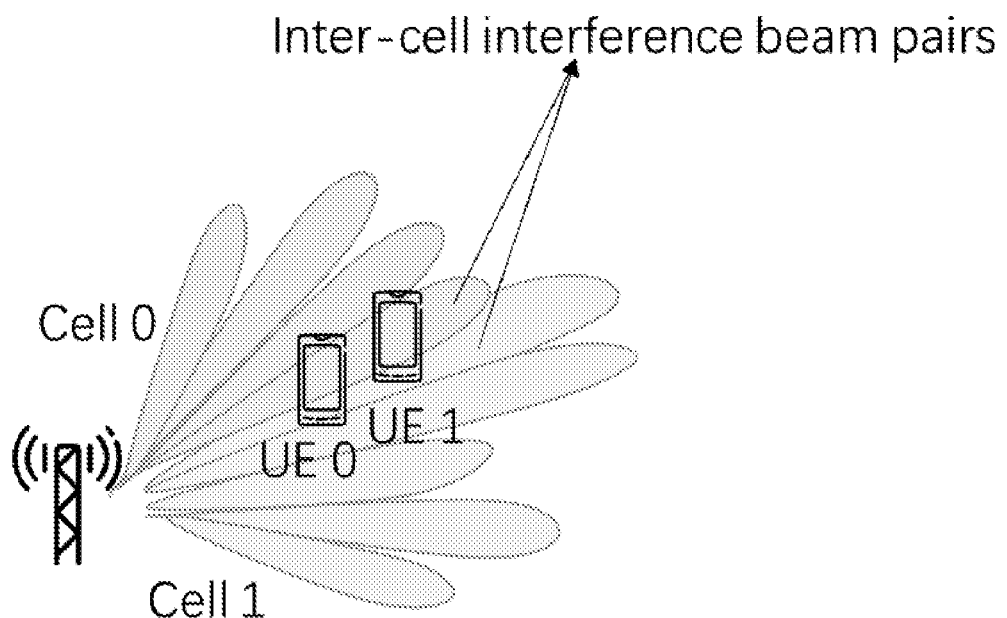

FIG. 4A-4B are diagrams illustrating exemplary inter-cell interference beam pairs according to some embodiments of the present disclosure. In a GoB system or any other multi-antenna system equipped with pre-defined beams, inter-cell interference may be more stable on specific beam pairs, each beam pair comprising a beam from a serving cell and a beam from a neighboring cell. As shown in FIGS. 4A-4B, some beams of a serving cell such as cell 0 may overlap with beams of a neighboring cell such as cell 1. According to an exemplary embodiment, the beams from different cells but overlapping with each other may be considered as an inter-cell interference beam pair. The inter-cell beam interference may usually exist at cell edge, for example, an area in which beams from two non-adjacent cells (e.g., cell 0 and cell 1 as shown in FIG. 4A) or two adjacent cells (e.g., cell 0 and cell 1 as shown in FIG. 4B) are at least partly overlapped. UEs (e.g., UE 0 and UE 1 shown in FIGS. 4A-4B) located within this area may be called cell edge UEs in some exemplary embodiments.

In order to improve the resource utilization and system performance of a communication network, various exemplary embodiments of the present disclosure propose a solution for inter-cell interference avoidance. The proposed solution may be applicable to a NR GoB system or any other multi-antenna system in which a set of beams may be pre-defined for data transmissions. In accordance with some exemplary embodiments, for a UE which may be recognized as a high inter-cell interference UE, a gNB can select, for example, according to information about inter-cell interference beam pairs, a serving beam for the UE so that the inter-cell beam interference can be avoided or significantly reduced. According to some exemplary embodiments, the inter-cell interference beam pairs may be defined as beam pairs comprising a pre-defined beam of a serving cell and one or more pre-defined beams of neighboring cell(s) at least partly overlapping with the serving cell.

In accordance with some exemplary embodiments, a gNB can perform cell edge UE recognition to collect information for inter-cell interference beam pairs recognition. The serving beam selection for a UE may be based at least in part on the collected information for inter-cell interference beam pairs recognition, so that the gNB can implement beam resource allocation for the UE with inter-cell interference avoidance. The proposed solution may not require cell scheduling information exchange or high UE capacity. Moreover, since it is UE specific/level inter-cell interference avoidance with SDM, the proposed solution may be implemented with more flexibility than soft frequency multiplexing.

Figure 5:
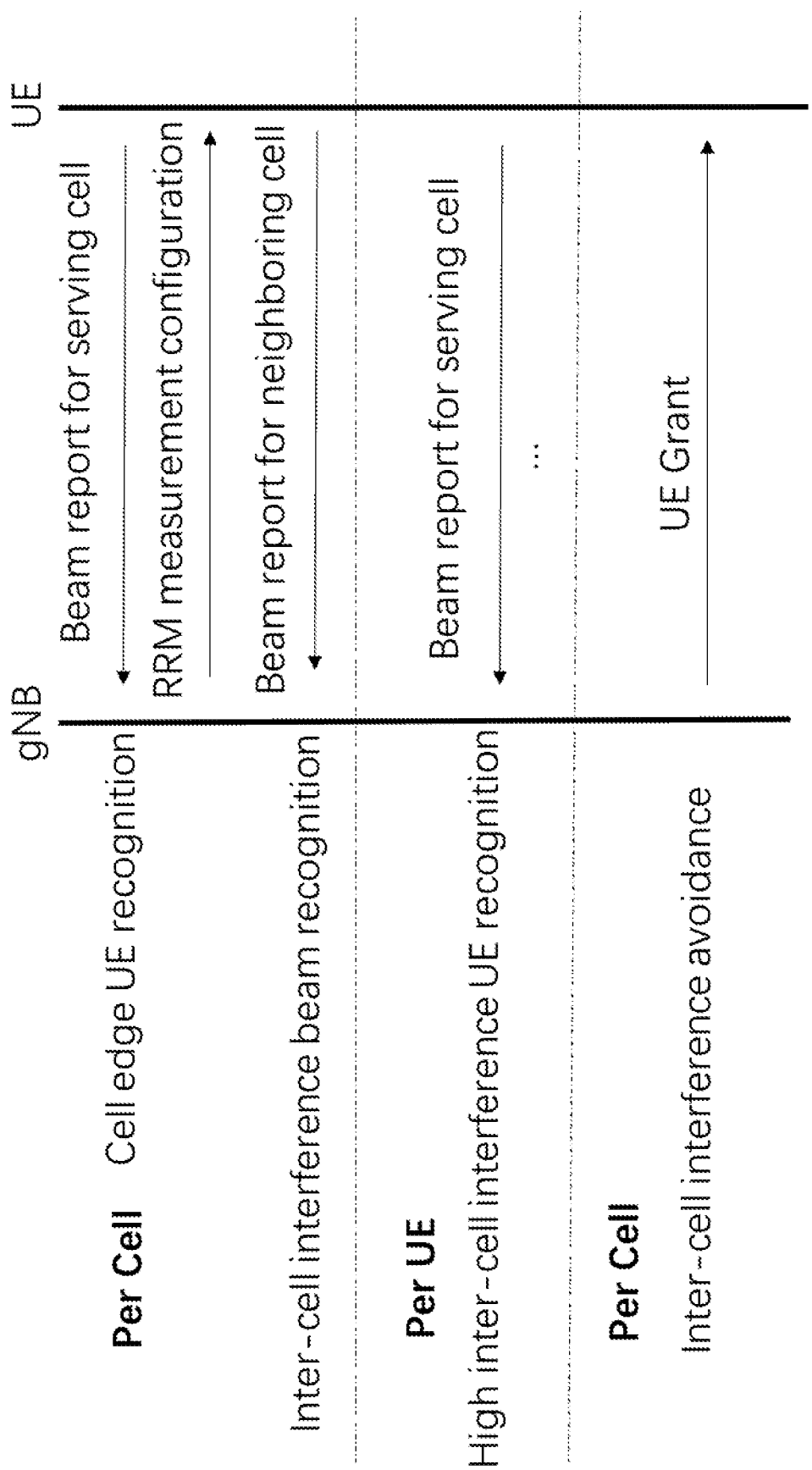
FIG. 5 is a diagram illustrating an exemplary inter-cell interference avoidance procedure according to an embodiment of the present disclosure.

FIG. 5 is a diagram illustrating an exemplary inter-cell interference avoidance procedure according to an embodiment of the present disclosure. For simplicity, FIG. 5 only schematically depicts the inter-cell interference avoidance procedure performed by a gNB to select a serving beam for a UE. It can be appreciated that procedure phases, signaling messages and transmission configurations illustrated in FIG. 5 are just examples, and more or less alternative procedure phases, signaling messages and transmission configurations may be involved in the inter-cell interference avoidance procedure according to the embodiments of the present disclosure.

As shown in FIG. 5, the exemplary inter-cell interference avoidance procedure may comprise the following four phases:

Phase I: Cell edge UE recognition, which may be performed per cell;
Phase II: Inter-cell interference beam recognition, which may be performed per cell;
Phase III: High inter-cell interference UE recognition, which may be performed per UE; and
Phase IV: Inter-cell interference avoidance, which may be performed per cell.

Generally, beam management may be always configured in a GoB system for data transmission. In phase I of the inter-cell interference avoidance procedure, the UE may send a beam report for serving cell to the gNB, according to measurement configuration for the UE. For example, the UE may report channel quality of the measured beam and the measured resource identifier (ID) to the gNB. Based at least in part on the measurement report of beam management, the gNB can recognize cell edge UEs (e.g., UE 0 and UE 1 in FIGS. 4A-4B) which may be located in areas where beams from different cells overlap each other at least partly. Optionally, the gNB can maintain a cell edge UE list to record the recognized cell edge UEs.

In accordance with an exemplary embodiment, a specific threshold may be set to determine a cell edge UE. If the RSRP reported by a UE is lower than the specific threshold (e.g., once or several times), this UE may be added into the cell edge UE list. In another example, if the RSRP reported by the UE is higher than the specific threshold (e.g., once or several times), the UE may be removed from the cell edge UE list. According to some exemplary embodiments, the adjacent cell deployment scenario as shown in FIG. 4B may be considered in phase I. For this scenario, if a UE reports a specified beam index/identifier to the gNB, this UE may be added into the cell edge UE list. The specified beam index/identifier may indicate an edge beam of a cell. Optionally, in the case that the beam reported by the UE is not the edge beam of the cell (e.g., during a certain period of time), this UE may be removed from the cell edge UE list. According to an exemplary embodiment, the gNB may update the cell edge UE list, for example, at specific time and/or occasion.

In phase II of the inter-cell interference avoidance procedure, the gNB may perform RRM measurement configuration for the cell edge UEs, as shown in FIG. 5, for example, instructing the cell edge UEs to report the measurements of neighboring cell beams (e.g., channel quality and the measured resource IDs). According to the RRM measurements reported by the cell edge UEs in a beam report for neighboring cell, the gNB can recognize the inter-cell interference beam pairs and optionally maintain an inter-cell interference beam pairs list.

In accordance with an exemplary embodiment, the gNB may configure the RRM measurement to trigger an RRM measurement report per UE in the cell edge UE list, for example, with event A4 (e.g., a neighbor becomes better than a specific threshold) and all the SSB/CSI-RS resources of the neighboring cell(s). Optionally, the RRM measurement configuration can reuse the settings in handover configuration (if it exists). According to an exemplary embodiment, the specific threshold for A4 event may be set according to the serving cell beam quality reported from the beam management of the UE.

In response to reception of an RRM measurement report (which may include one or more resource IDs) from a cell edge UE, the gNB can determine one or more beams (which may be indicated by M resource IDs associated with the highest interference level) as inter-cell interference beams to the favorable serving beam (which may have the best channel quality) of the cell edge UE. For example, if the favorable serving beam indicated by the beam report for serving cell of UE 0 is {beam 1}, and M (e.g., M=3) resource IDs associated with the highest signal quality indicated by the RRM measurement report of UE 0 are {resource ID 4, resource ID 6, resource ID 7}, then the gNB may set {resource ID 4, resource ID 6, resource ID 7} as inter-cell interference beams to {beam 1} in the inter-cell interference beam pairs list. Optionally, the inter-cell interference beam pairs list may be updated/adjusted according to the RRM measurement reports of all or part of the cell edge UEs.

Figure 6:
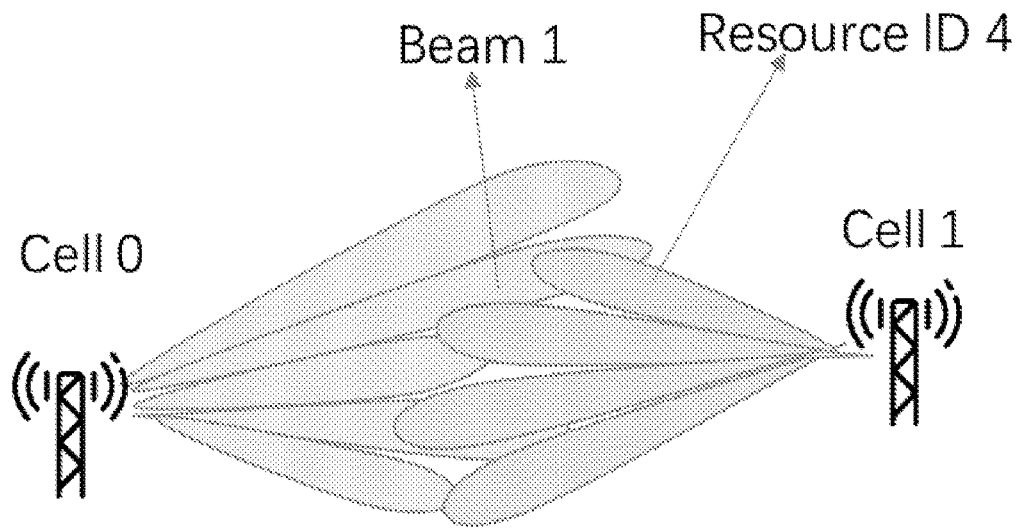
FIG. 6 is a diagram illustrating an exemplary inter-cell interference beam pair according to an embodiment of the present disclosure.

FIG. 6 is a diagram illustrating an exemplary inter-cell interference beam pair according to an embodiment of the present disclosure. In the exemplary embodiment, a counter may be set for each pair of serving beam (e.g., beam 1 of cell 0 in FIG. 6) and interference resource (e.g., neighboring resource of cell 1 in FIG. 6, which may be indicated by resource ID 4). If the pair is repeated over K times according to beam reports of the cell edge UEs, this pair may be recognized as an inter-cell interference beam pair. The value of K can be determined by those skilled in the art. Optionally, the counter may be initialized after a certain period of time. As an example, for the inter-cell interference beam pairs list {resource ID 4, resource ID 6, resource ID 7} for {beam 1}, if one more report indicates {resource ID 4} as the inter-cell interference beam to {beam 1}, then the counter for the pair of {beam 1} and {resource ID 4} may be added by 1. If the counter for the pair of {beam 1} and {resource ID 4} reaches to K, then the pair of {beam 1} and {resource ID 4} may be recognized as the inter-cell interference beam pair, which may be represented by {beam 1}→{resource ID 4}. Optionally, the gNB may determine {resource ID 4} as the inter-cell interference beam to the serving beam {beam 1}, if {resource ID 4} is reported more than a certain number of times and the interference level of the resource indicated by {resource ID 4} is higher than a certain threshold.

Similarly, the gNB can recognize the corresponding inter-cell interference beam pairs for different serving beams, and finally get a stable inter-cell interference beam pairs list, for example, including but not limited to the following elements:

{beam 0}→{ };
{beam 1}→{resource ID 4};
{beam 3}→{resource ID 6, resource ID 10};
{beam 6}→{resource ID 8};
{beam 7}→{resource ID 9, resource ID 4, resource ID 8}; and
{beam 9}→{resource ID 11}.

It can be appreciated that there may be no inter-cell interference resource/beam reported for a serving beam (e.g., beam 0). In this case, the inter-cell interference beam pairs list for this serving beam may be represented by a null set { } or in any other suitable form.

In accordance with some exemplary embodiments, the gNB may not perform operations in phase I and phase II of the inter-cell interference avoidance procedure. As an example, the gNB may obtain the inter-cell interference beam pairs list according to preconfigured network deployment (e.g., pre-configuration information of beams at cell edge) or from other network entity which can determine inter-cell interference information, without recognizing cell edge UEs and inter-cell interference beam pairs.

According to the inter-cell interference beam pairs list, the gNB can select most suitable beam for a UE (e.g., a high inter-cell interference UE which may be identified based at least in part on a beam report from beam management of this UE) to avoid inter-cell interference on the UE. It can be appreciated that a high inter-cell interference UE may not act as a cell edge UE. The difference between the high inter-cell interference UE and the cell edge UE may be in that the cell edge UE can be used to assist in inter-cell interference beam pairs recognition, while the high inter-cell interference UE is the target UE for which the interference avoidance process may be performed by the gNB. In accordance with some exemplary embodiments, a UE may be recognized as a cell edge UE during evaluation of the inter-cell interference (e.g., phase I and II of the inter-cell interference avoidance procedure). Alternatively o additionally, the UE may be recognized as a high inter-cell interference UE during beam selection (e.g., phase III and IV of the inter-cell interference avoidance procedure).

In phase III of the inter-cell interference avoidance procedure, the high inter-cell interference UE recognition may be implemented according to a beam report for serving cell from beam management of a UE. By performing the beam management, the gNB can configure the UE to report RSRP for the measured resource (e.g., SSB/CSI-RS, etc.), for example, including 4 best RSRP and the corresponding resource IDs. The gNB can transfer the reported resource IDs to the serving beam indexes. In accordance with an exemplary embodiment, an RSRP threshold may be set for high inter-cell interference UE recognition. If the RSRP indicated by a beam report of the UE is lower than the RSRP threshold (e.g., once or several times), then this UE may be recognized as a high inter-cell interference UE. If the RSRP indicated by a beam report of the UE is higher than the RSRP threshold (e.g., once or several times), it may not be recognized as a high inter-cell interference UE. Alternatively or additionally, the adjacent cell deployment scenario may be considered during phase III. In this case, if the UE reports a specific beam index/identifier (e.g., indicating that the reported beam is an edge beam of the serving cell), this UE may be recognized as a high inter-cell interference UE.

In phase IV of the inter-cell interference avoidance procedure, the gNB can select a suitable transmission beam for a high inter-cell interference UE to avoid the inter-cell interference, according to the inter-cell interference beam pairs list and the beam report from beam management of the UE. For example, the gNB may receive a beam report for serving cell from the UE to indicate the candidate beams {beam 0, beam 1, beam 3, beam 7} for the best serving beam. According to the inter-cell interference beam pairs list obtained in phase II, the gNB can determine the corresponding inter-cell interference beam pairs as follow:

{beam 0}→{ };
{beam 1}→{resource ID 4};
{beam 3}→{resource ID 6, resource ID 10}; and
{beam 7}→{resource ID 9, resource ID 4, resource ID 8}.

In accordance with an exemplary embodiment, the gNB can select a candidate beam that has the minimum number of inter-cell interference resources as the best serving beam (e.g., beam 0) for the UE.

Alternatively or additionally, the gNB may select the best serving beam by jointly considering the RSRP of inter-cell interference resource and the RSRP of the serving beam. In this case, the inter-cell interference beam pairs list may also maintain the RSRP of the respective interference resources (e.g., which may be obtained by filtering with each beam report for neighboring cell). According to an exemplary embodiment, the gNB may check interference level of the candidate beams reported by the UE, and select a candidate beam to which the inter-cell interference resource has the lowest interference level, as the best serving beam for the UE. For example, the gNB may compare the RSRP of the inter-cell interference resource (e.g., {resource ID 4}) for a candidate beam (e.g., {beam 1}) with the RSRP of the inter-cell interference resource (e.g., {resource ID 6, resource ID 10}) for another candidate beam (e.g., {beam 3}). If the RSRP corresponding to resource ID 4 is higher than the sum of the RSRP corresponding to resource ID 6 and the RSRP corresponding to resource ID 10, then the gNB may select {beam 3} as the best serving beam for the UE, although the number of inter-cell interference resource for {beam 1} is less than the number of inter-cell interference resource for {beam 3}. Optionally, the RSRP of candidate beams reported by the UE may also be considered for beam selection. For example, if the RSRP of a candidate beam is lower than a specific level, this candidate beam may not be selected as the serving beam for the UE, even though the number of inter-cell interference resource for this candidate beam is small.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 7A:
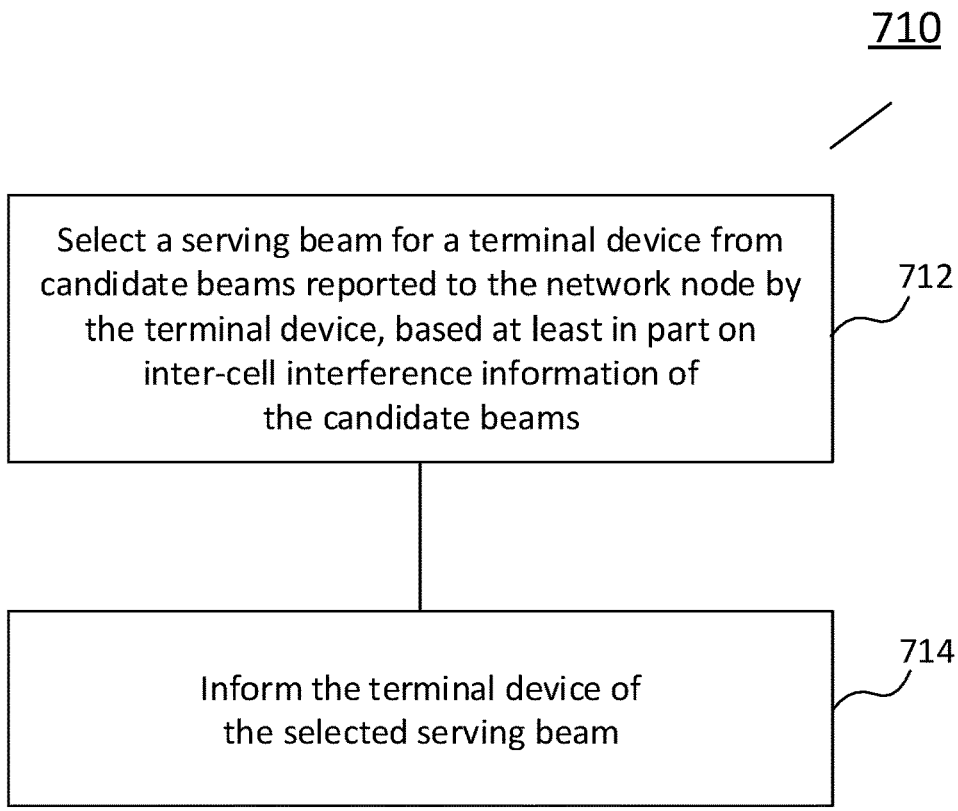
FIG. 7A is a flowchart illustrating a method according to some embodiments of the present disclosure.

FIG. 7A is a flowchart illustrating a method 710 according to some embodiments of the present disclosure. The method 710 illustrated in FIG. 7A may be performed by a network node or an apparatus communicatively coupled to the network node. In accordance with an exemplary embodiment, the network node may comprise a base station, an AP, a transmission point or any other suitable entity which may be capable of serving one or more terminal devices such as UEs according to specific communication configurations.

According to the exemplary method 710 illustrated in FIG. 7A, the network node can select a serving beam for a terminal device from candidate beams reported to the network node by the terminal device, based at least in part on inter-cell interference information of the candidate beams, as shown in block 712. In accordance with some exemplary embodiments, the candidate beams may be pre-defined at the network node. For example, the candidate beams may be deployed in a GoB system for data transmission, and thus the inter-cell interference information of the candidate beams may reflect relatively stable inter-cell interference to the candidate beams.

In accordance with some exemplary embodiments, the inter-cell interference information of the candidate beams may indicate at least one of: the number of inter-cell interferers per candidate beam; and interference level of the inter-cell interferers per candidate beam. As an example, an inter-cell interferer of a candidate beam may comprise a resource or a beam from a neighboring cell of which the coverage may at least partly overlap with that of a serving cell of the terminal device. The candidate beam and the corresponding inter-cell interferer may be called an inter-cell interference beam pair as described with respect to FIG. 4A, FIG. 4B and FIG. 6. According to an exemplary embodiment, the inter-cell interference information of the candidate beams may be maintained in an inter-cell interference beam pairs list as described with respect to FIG. 5 and FIG. 6, which may comprise one or more inter-cell interference beam pairs, each pair including a beam provided by the network node and a beam or resource provided by a neighboring network node of which the coverage partly overlaps with that of the network node.

It can be appreciated that the candidate beam reported to the network node by the terminal device may have no inter-cell interferer. In this case, the inter-cell interferer of this candidate beam (e.g., beam 0 as described with respect to FIG. 5) may be represented by a null set { } in the inter-cell interference beam pairs list. Optionally, for the candidate beam having no inter-cell interferer, there may be no record in the inter-cell interference beam pairs list. Regardless of the recording/maintaining/storing form, the inter-cell interference information of a candidate beam can indicate whether the candidate beam has an inter-cell interferer, how many inter-cell interferer(s) the candidate beam may have, and/or how much an inter-cell interferer may affect data transmission over the candidate beam, etc.

In accordance with some exemplary embodiments, the candidate beams may be reported to the network node by serving cell measurement information of the terminal device. For example, the network node may perform beam management to configure the terminal device to send a beam report including the serving cell measurement information to the network node. The serving cell measurement information may comprise resource indexes/IDs associated with the candidate beams reported by the terminal device. Optionally, the serving cell measurement information may comprise information indicating that the terminal device is potentially subject to inter-cell beam interference (e.g., in the case that the terminal device is located at the edge of the serving cell provided by the network node).

In accordance with some exemplary embodiments, the serving cell measurement information of the terminal device may indicate that serving cell signal quality of the terminal device is lower than a first quality threshold (e.g., the RSRP of one or more candidate beams reported by the terminal device is lower than the first quality threshold). Alternatively or additionally, the serving cell measurement information of the terminal device may indicate that at least one of the candidate beams reported by the terminal device meets a first criterion (e.g., one or more of the candidate beams at least partly overlap with beams or resources from a cell adjacent to the serving cell provided by the network node). According to the serving cell measurement information of the terminal device, the network node can determine whether the terminal device is a high inter-cell interference UE, and perform serving beam selection for the terminal device based at least in part on the determination, as described with respect to FIG. 5.

In accordance with some exemplary embodiments, the inter-cell interference information of the candidate beams may be based on at least one of: predetermined beam configuration information (e.g., configuration information about beams deployed at the edge of the serving cell), and an evaluation of inter-cell beam interference for the network node (e.g., phase I and II of the inter-cell interference avoidance procedure for evaluating the inter-cell interference beam pairs list, as described in connection with FIG. 5). It can be appreciated that the evaluation of inter-cell beam interference may be performed by the network node or any other suitable network entity which can provide the evaluation result to the network node.

In accordance with some exemplary embodiments, the evaluation of the inter-cell beam interference for the network node may comprise: performing measurement configuration for one or more reference devices (e.g., cell edge UEs described with respect to FIG. 5) which are potentially subject to inter-cell beam interference. The measurement configuration (e.g., RRM measurement configuration described in connection with FIG. 5) may instruct the one or more reference devices to report neighboring cell measurement information to the network node in response to a trigger event (e.g., event A4 as described with respect to FIG. 5). According to an exemplary embodiment, the trigger event for a reference device may comprise that neighboring cell signal quality of the reference device is higher than a third quality threshold (e.g., the neighboring cell RSRP of the reference device is higher than the third quality threshold, where the third quality threshold may be optionally lower than a handover threshold).

In accordance with some exemplary embodiments, the evaluation of the inter-cell beam interference for the network node may further comprise: receiving the neighboring cell measurement information reported by the one or more reference devices in response to the trigger event. The neighboring cell measurement information (e.g., resource IDs of the measured SSB/CSI-RS resources of neighboring cells) may indicate potential inter-cell interferers of beams reported to the network node by serving cell measurement information (e.g., beam indexes indicated by beam reports) of the one or more reference devices.

According to an exemplary embodiment, the serving cell measurement information of the one or more reference devices may indicate that serving cell signal quality (e.g., RSRP/RSRQ, etc.) of at least one of the one or more reference devices is lower than a second quality threshold. In this case, the at least one reference device may be recognized as a cell edge UE due to bad signal quality in the serving cell. Alternatively or additionally, the serving cell measurement information of the one or more reference devices may indicate that at least one of the beams reported by the one or more reference devices meets a second criterion (e.g., the reported at least one beam is a cell edge beam).

In accordance with some exemplary embodiments, the evaluation of the inter-cell beam interference for the network node may further comprise: evaluating the inter-cell beam interference, based at least in part on the neighboring cell measurement information reported by the one or more reference devices. In an exemplary embodiment, the inter-cell beam interference may be evaluated according to statistical results of the neighboring cell measurement information, for example, by setting a counter per beam pair and/or considering interference level per inter-cell interferer as described with respect to FIG. 6. Optionally, the evaluation of the inter-cell beam interference for the network node may be updated according to a specific rule (e.g., being triggered by a specific event, periodically or as required).

In accordance with some exemplary embodiments, the one or more reference devices may comprise the terminal device. In this case, the terminal device (e.g., a high inter-cell interference UE which may also be recognized as a cell edge UE as described in connection with FIG. 5) may be configured by the network node to perform RRM measurement on resources (e.g., SSB/CSI-RS, etc.) of neighboring cells and report neighboring cell measurement information to the network node, in addition to the serving cell measurement information of the terminal device. The neighboring cell measurement information of the terminal device may be used to evaluate the inter-cell beam interference for the network node and determine the inter-cell interference information for serving beam selection with less or no inter-cell interference.

In accordance with some exemplary embodiments, the network node can inform the terminal device of the selected serving beam, as shown in block 714. For example, the network node may transmit information about the selected serving beam to the terminal device, together with UL scheduling signaling (e.g., UL grant) for the terminal device or separately.

Figure 7B:
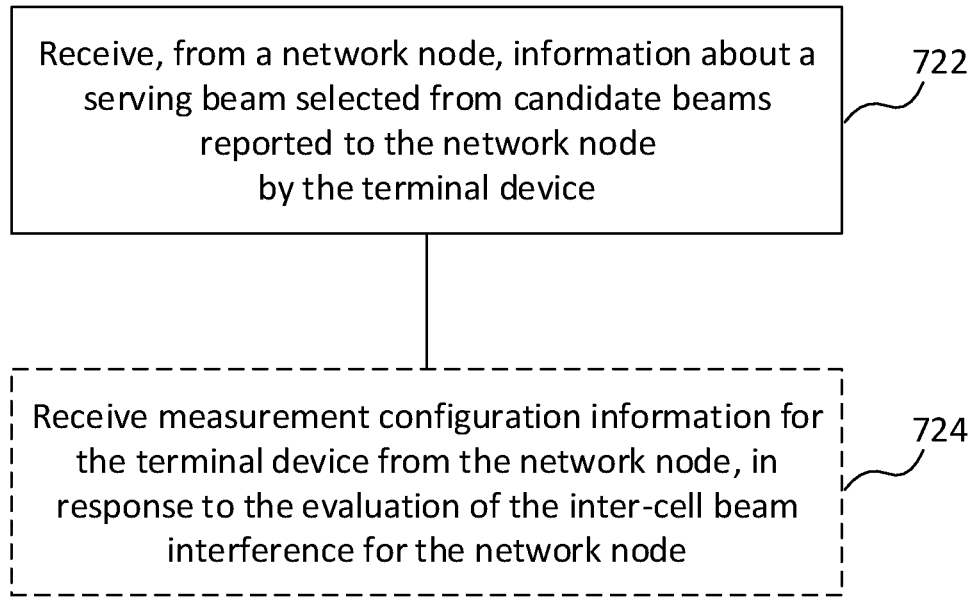
FIG. 7B is a flowchart illustrating another method according to some embodiments of the present disclosure.

FIG. 7B is a flowchart illustrating a method 720 according to some embodiments of the present disclosure. The method 720 illustrated in FIG. 7B may be performed by a terminal device or an apparatus communicatively coupled to the terminal device. In accordance with an exemplary embodiment, the terminal device such as a UE may be capable of communicating with a network node (e.g., a base station, an AP, a transmission point, etc.) according to specific communication configurations. It can be appreciated that operations/steps of the method 720 illustrated in FIG. 7B may correspond to operations/steps of the method 710 illustrated in FIG. 7A. The network node described in connection with FIG. 7A can perform the method 710 for inter-cell interference avoidance to optimize the serving beam selection for the terminal device as described in connection with FIG. 7B.

According to the exemplary method 720 illustrated in FIG. 7B, the terminal device can receive from a network node (e.g., the network node as described with respect to FIG. 7A) information about a serving beam selected from candidate beams reported to the network node by the terminal device, as shown in block 722. The selection of the serving beam may be based at least in part on inter-cell interference information of the candidate beams. According to some exemplary embodiments, the candidate beams may be some pre-defined beams that are deployed at the network node, for example, in a GoB system.

It can be appreciated that the inter-cell interference information mentioned here may comprise the inter-cell interference information as described in connection with FIG. 7A. For example, the inter-cell interference information may be determined according to predetermined beam configuration information and/or evaluation of the inter-cell beam interference for the network node. In an exemplary embodiment, the inter-cell interference information may indicate whether a candidate beam has no inter-cell interferer, one inter-cell interferer, or multiple inter-cell interferers. Alternatively or additionally, the inter-cell interference information may indicate interference level of the inter-cell interferer(s) per candidate beam. For the candidate beam having no inter-cell interferer, there may be no record of interference level of the inter-cell interferer in the inter-cell interference information.

In accordance with some exemplary embodiments, the terminal device may be a high inter-cell interference UE recognized by the network node as described in connection with FIG. 5. The terminal device may report the candidate beams to the network node by serving cell measurement information of the terminal device. According to the serving cell measurement information (e.g., RSRP, RSRQ, a resource ID, a beam index, etc.), the network node can determine that the terminal device may potentially suffer inter-cell interference from one or more beams of the neighboring cell(s).

Optionally, the terminal device may receive measurement configuration information for the terminal device from the network node, in response to the evaluation of the inter-cell beam interference for the network node, as shown in block 724. The measurement configuration information may instruct the terminal device to report neighboring cell measurement information to the network node in response to a trigger event (e.g., event A4). In this case, the terminal device may be a cell edge UE recognized by the network node as described in connection with FIG. 5. For example, the serving cell measurement information of the terminal device may indicate to the network node that serving cell signal quality of the terminal device is lower than a second quality threshold (e.g., a specific threshold which may be used to determine whether the terminal device is located at the edge of the serving cell provided by the network node), and/or at least one of the candidate beams reported by the terminal device meets a second criterion (e.g., one or more candidate beams are cell edge beams of the network node).

It can be appreciated that the operation in block 724 may occur before, after or at the same time as the operation in block 722, depending on when the evaluation of the inter-cell beam interference for the network node is initiated. In an exemplary embodiment, the terminal device may receive the information about the selected serving beam and the measurement configuration information in the same signaling message from the network node.

In accordance with some exemplary embodiments, the terminal device may perform neighboring cell measurement according to the measurement configuration information for the terminal device, and transmit the neighboring cell measurement information of the terminal device to the network node, in response to the trigger event. The neighboring cell measurement information may indicate potential inter-cell interferers of the candidate beams reported to the network node by serving cell measurement information of the terminal device.

The proposed solution according to some exemplary embodiments can enable a network node such as a base station to select the best serving beam for a terminal device such as a UE by avoiding inter-cell interference effectively, so as to bring higher network throughput and resource utilization. Various embodiments may be applicable to a GoB system or other multi-antenna systems which may be equipped with pre-defined beams and thus have stable inter-cell interference on specific beam pairs from a serving cell and neighboring cells. According to an exemplary embodiment, a UE (e.g., a high inter-cell interference UE) in the overlapping area of multi-cells may be configured with a port CSI for some pre-defined narrow beams and send a certain number of RSRP reports to a gNB providing a serving cell to the UE. By using the proposed solution for inter-cell interference avoidance, the gNB can select a beam for the UE from the reported favorable beams, where the selected beam may not be the reported favorable beam which is in the overlapping area of the serving cell and a neighboring cell, but may be the reported favorable beam which is not in the coverage of the neighboring cell. Optionally, in order to collect inter-cell interference information, the gNB may configure cell edge UEs to perform RRM measurement and report neighboring cell measurement information to the gNB in response to a specific event (e.g., event A4), so that the gNB can obtain an inter-cell interference beam pairs list for the optimized beam selection. The proposed solution can advantageously improve network performance and resource efficiency, and enhance flexibility of system configuration and implementation.

The various blocks shown in FIGS. 7A-7B may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8:
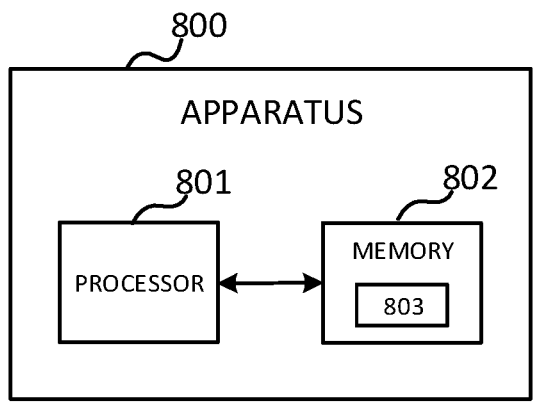
FIG. 8 is a block diagram illustrating an apparatus according to some embodiments of the present disclosure.

FIG. 8 is a block diagram illustrating an apparatus 800 according to various embodiments of the present disclosure. As shown in FIG. 8, the apparatus 800 may comprise one or more processors such as processor 801 and one or more memories such as memory 802 storing computer program codes 803. The memory 802 may be non-transitory machine/processor/computer readable storage medium. In accordance with some exemplary embodiments, the apparatus 800 may be implemented as an integrated circuit chip or module that can be plugged or installed into a network node as described with respect to FIG. 7A, or a terminal device as described with respect to FIG. 7B. In such case, the apparatus 800 may be implemented as a network node as described with respect to FIG. 7A, or a terminal device as described with respect to FIG. 7B.

In some implementations, the one or more memories 802 and the computer program codes 803 may be configured to, with the one or more processors 801, cause the apparatus 800 at least to perform any operation of the method as described in connection with FIG. 7A. In other implementations, the one or more memories 802 and the computer program codes 803 may be configured to, with the one or more processors 801, cause the apparatus 800 at least to perform any operation of the method as described in connection with FIG. 7B.

Alternatively or additionally, the one or more memories 802 and the computer program codes 803 may be configured to, with the one or more processors 801, cause the apparatus 800 at least to perform more or less operations to implement the proposed methods according to the exemplary embodiments of the present disclosure.

Various embodiments of the present disclosure provide an apparatus which may comprise a selecting unit and an informing unit. In an exemplary embodiment, the apparatus may be implemented in a network node such as a base station. The selecting unit may be operable to carry out the operation in block 712, and the informing unit may be operable to carry out the operation in block 714. Optionally, the selecting unit and/or the informing unit may be operable to carry out more or less operations to implement the proposed methods according to the exemplary embodiments of the present disclosure.

Various embodiments of the present disclosure provide an apparatus which may comprise a receiving unit. In an exemplary embodiment, the apparatus may be implemented in a terminal device such as a UE. The receiving unit may be operable to carry out the operation in block 722. In an exemplary embodiment, the receiving unit may also be operable to carry out the operation in block 724. Optionally, the receiving unit may be operable to carry out more or less operations to implement the proposed methods according to the exemplary embodiments of the present disclosure.

Figure 9:
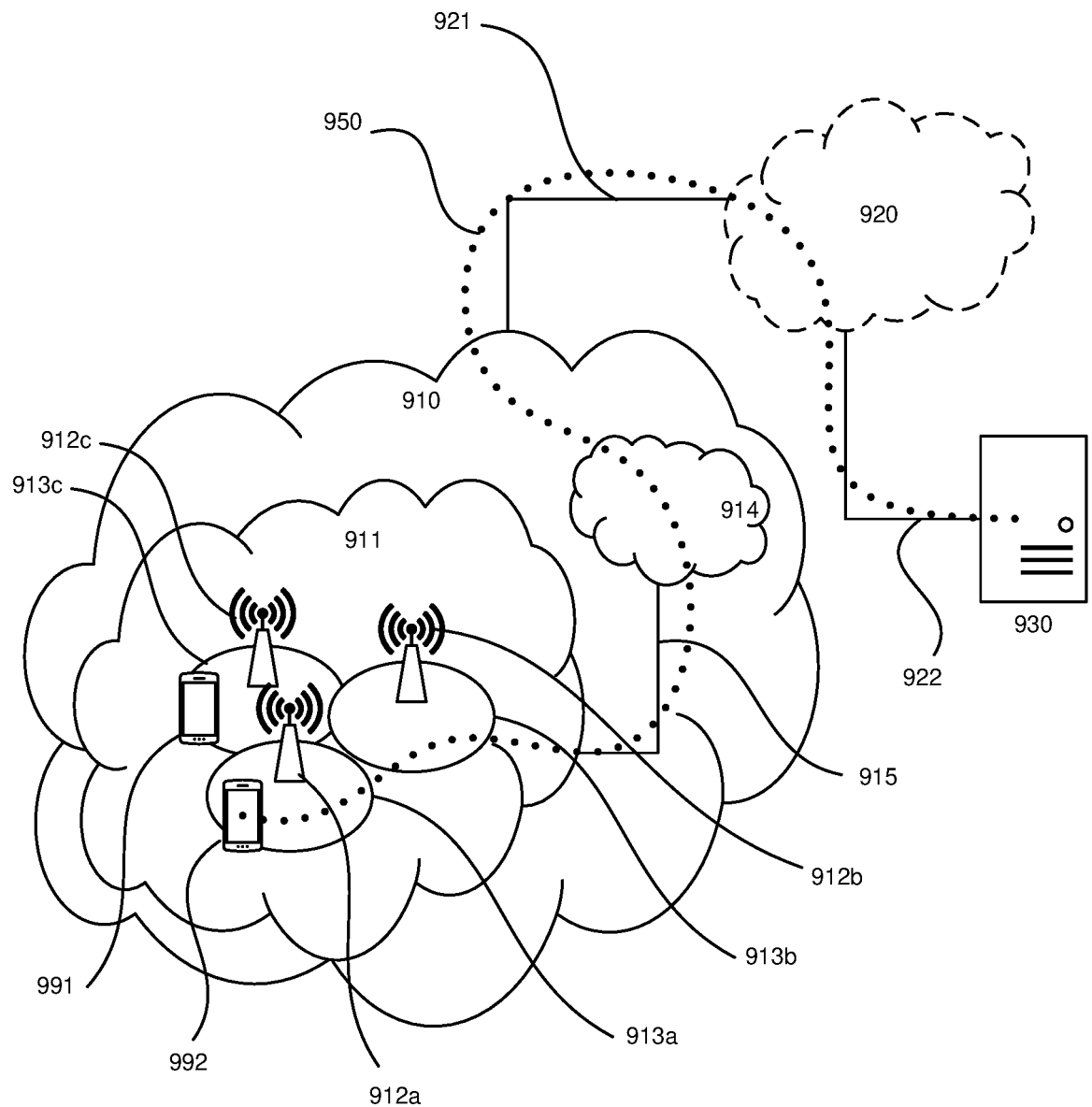
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
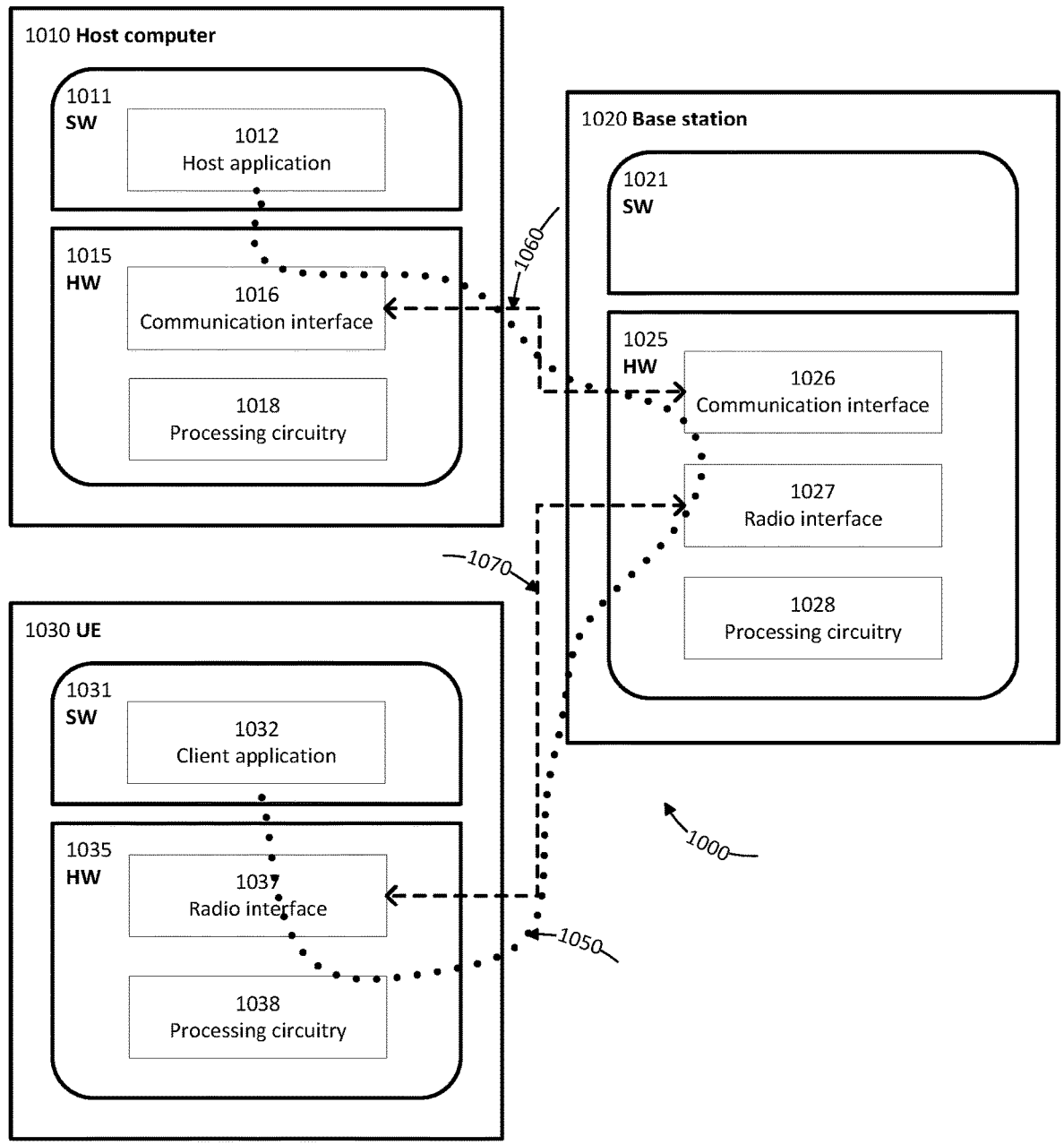
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
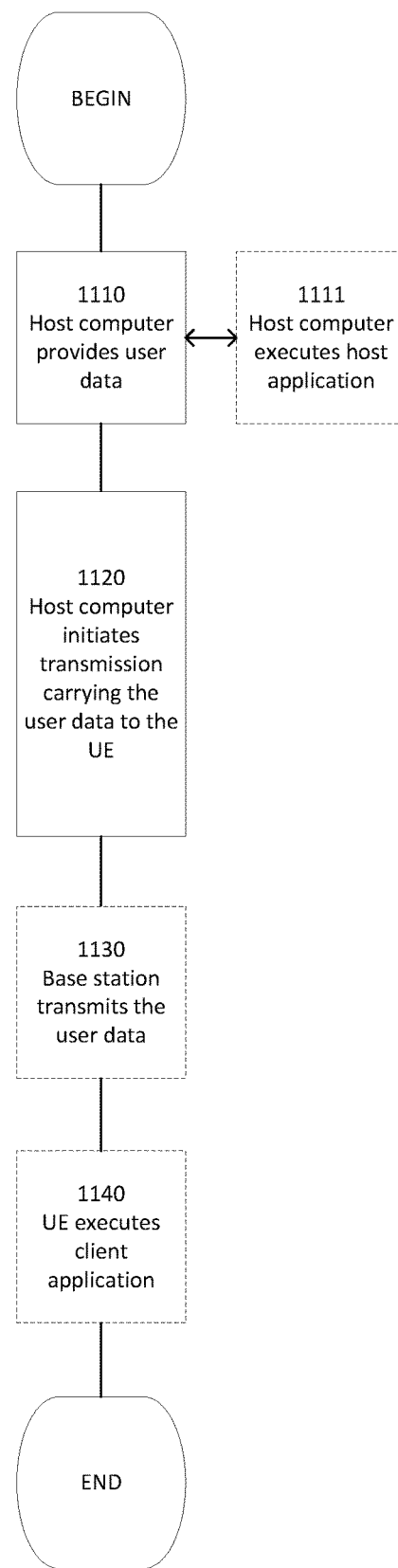
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In sub step 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
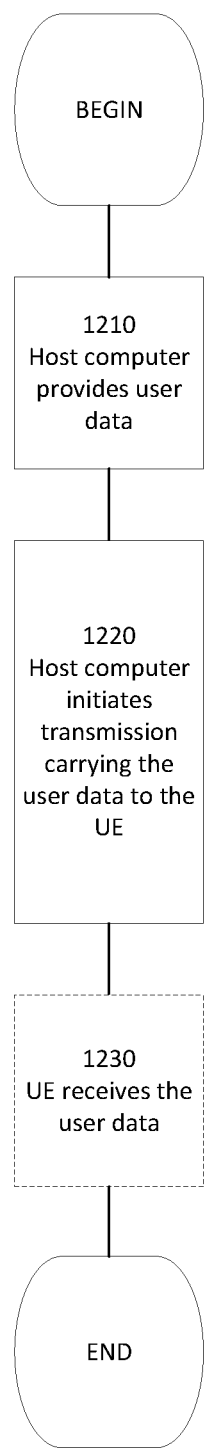
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
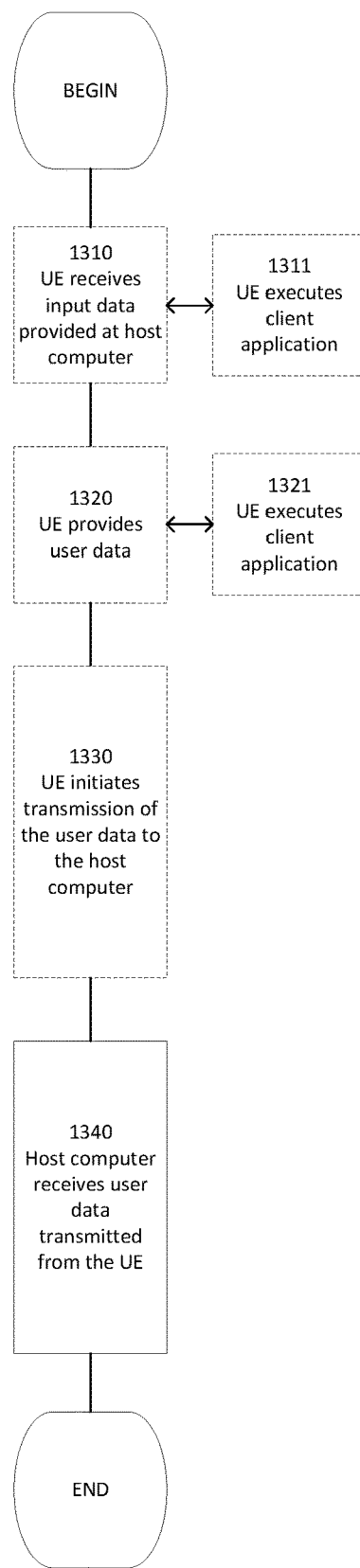
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
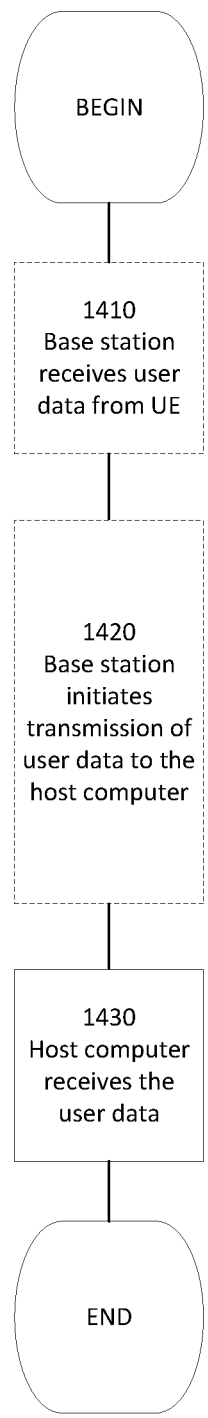
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 710 as describe with respect to FIG. 7A.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 710 as describe with respect to FIG. 7A.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 720 as describe with respect to FIG. 7B.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 720 as describe with respect to FIG. 7B.

According to some exemplary embodiments, there is provided a method implemented in a communication system which may include a host computer, a base station and a UE. The method may comprise, at the host computer, receiving user data transmitted to the base station from the UE which may perform any step of the exemplary method 720 as describe with respect to FIG. 7B.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 720 as describe with respect to FIG. 7B.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 710 as describe with respect to FIG. 7A.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 710 as describe with respect to FIG. 7A.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a network node, comprising:
selecting a serving beam for a terminal device from candidate beams reported to the network node by the terminal device, based at least in part on inter-cell interference information of the candidate beams; and
informing the terminal device of the selected serving beam, and
wherein the inter-cell interference information of the candidate beams is based on an evaluation of inter-cell beam interference for the network node, wherein the evaluation of the inter-cell beam interference for the network node comprises:
performing measurement configuration for one or more reference devices which are potentially subject to inter-cell beam interference, wherein the measurement configuration instructs the one or more reference devices to report neighboring cell measurement information to the network node in response to a trigger event;
receiving the neighboring cell measurement information reported by the one or more reference devices in response to the trigger event, wherein the neighboring cell measurement information indicates potential inter-cell interferers of beams reported to the network node by serving cell measurement information of the one or more reference devices; and
evaluating the inter-cell beam interference, based at least in part on the neighboring cell measurement information reported by the one or more reference devices.

2. The method according to claim 1, wherein the inter-cell interference information of the candidate beams indicates at least one of:
a number of inter-cell interferers per candidate beam; and
interference level of the inter-cell interferers per candidate beam.

3. The method according to claim 1, wherein the candidate beams are reported to the network node by serving cell measurement information of the terminal device, and wherein the serving cell measurement information comprises information indicating that the terminal device is potentially subject to inter-cell beam interference.

4. The method according to claim 3, wherein the serving cell measurement information of the terminal device indicates at least one of:
serving cell signal quality of the terminal device being lower than a first quality threshold; and
at least one of the candidate beams meeting a first criterion.

5. The method according to claim 1, wherein the inter-cell interference information of the candidate beams is further based on
predetermined beam configuration information.

6. The method according to claim 1, wherein the serving cell measurement information of the one or more reference devices indicates at least one of:

serving cell signal quality of at least one of the one or more reference devices being lower than a second quality threshold; and at least one of the beams reported by the one or more reference devices meeting a second criterion.

7. The method according to claim 1, wherein the trigger event for a reference device comprises that neighboring cell signal quality of the reference device is higher than a third quality threshold.

8. The method according to claim 1, wherein the one or more reference devices comprise the terminal device.

9. The method according to claim 5, wherein the evaluation of the inter-cell beam interference for the network node is updated according to a specific rule.

10. The method according to claim 1, wherein the candidate beams are pre-defined at the network node.

11. A method performed by a terminal device, comprising:
receiving, from a network node, information about a serving beam selected from candidate beams reported to the network node by the terminal device, wherein the selection of the serving beam is based at least in part on inter-cell interference information of the candidate beams, and
wherein the inter-cell interference information of the candidate beams is based on an evaluation of inter-cell beam interference for the network node, wherein the method further comprises receiving measurement configuration information for the terminal device from the network node, in response to the evaluation of the inter-cell beam interference for the network node, wherein the measurement configuration information instructs the terminal device to report neighboring cell measurement information to the network node in response to a trigger event.

12. The method according to claim 11, wherein the inter-cell interference information of the candidate beams indicates at least one of:
a number of inter-cell interferers per candidate beam; and
interference level of the inter-cell interferers per candidate beam.

13. The method according to claim 11, wherein the candidate beams are reported to the network node by serving cell measurement information of the terminal device, and wherein the serving cell measurement information comprises information indicating that the terminal device is potentially subject to inter-cell beam interference.

14. The method according to claim 13, wherein the serving cell measurement information of the terminal device indicates at least one of:
serving cell signal quality of the terminal device being lower than a first quality threshold; and
at least one of the candidate beams meeting a first criterion.

15. The method according to claim 11, wherein the inter-cell interference information of the candidate beams is further based on
predetermined beam configuration information.

16. The method according to claim 11, further comprising:
performing neighboring cell measurement according to the measurement configuration information for the terminal device; and
transmitting the neighboring cell measurement information of the terminal device to the network node, in response to the trigger event, wherein the neighboring cell measurement information indicates potential inter-cell interferers of the candidate beams reported to the network node by serving cell measurement information of the terminal device.

17. The method according to 16, wherein the serving cell measurement information of the terminal device indicates at least one of:
serving cell signal quality of the terminal device being lower than a second quality threshold; and
at least one of the candidate beams reported by the terminal device meeting a second criterion.

18. A network node, comprising:
one or more processors; and
one or more memories storing computer program codes,
the one or more memories and the computer program codes configured to, with the one or more processors, cause the network node at least to:
select a serving beam for a terminal device from candidate beams reported to the network node by the terminal device, based at least in part on inter-cell interference information of the candidate beams; and
inform the terminal device of the selected serving beam, and
wherein the inter-cell interference information of the candidate beams is based on an evaluation of inter-cell beam interference for the network node, wherein the evaluation of the inter-cell beam interference for the network node comprises:
performing measurement configuration for one or more reference devices which are potentially subject to inter-cell beam interference, wherein the measurement configuration instructs the one or more reference devices to report neighboring cell measurement information to the network node in response to a trigger event;
receiving the neighboring cell measurement information reported by the one or more reference devices in response to the trigger event, wherein the neighboring cell measurement information indicates potential inter-cell interferers of beams reported to the network node by serving cell measurement information of the one or more reference devices; and
evaluating the inter-cell beam interference, based at least in part on the neighboring cell measurement information reported by the one or more reference devices.

* * * * *